(12) United States Patent
Perkins et al.

(10) Patent No.: US 7,290,439 B2
(45) Date of Patent: Nov. 6, 2007

(54) METHODS AND APPARATUS FOR LEAK DETECTION BY THE ACCUMULATION METHOD

(75) Inventors: Charles Perkins, Boston, MA (US); Pieter N. Palenstijn, Plympton, MA (US)

(73) Assignee: Varian, Inc., Palo Alto, CA (US)

( * ) Notice: Subject to any disclaimer, the term of this patent is extended or adjusted under 35 U.S.C. 154(b) by 37 days.

(21) Appl. No.: 10/524,283

(22) PCT Filed: Jun. 9, 2004

(86) PCT No.: PCT/US2004/018352

§ 371 (c)(1),
(2), (4) Date: Feb. 10, 2005

(87) PCT Pub. No.: WO2005/001410

PCT Pub. Date: Jan. 6, 2005

(65) Prior Publication Data

US 2005/0223779 A1    Oct. 13, 2005

(51) Int. Cl.
*G01M 3/20* (2006.01)
*G01M 3/22* (2006.01)
(52) U.S. Cl. .......................... 73/40.7; 73/40
(58) Field of Classification Search .............. 73/40, 73/40.7, 49.2, 49.3
See application file for complete search history.

(56) References Cited

U.S. PATENT DOCUMENTS

| | | | | |
|---|---|---|---|---|
| 3,280,619 A * | 10/1966 | Spies | | 73/40.7 |
| 3,591,827 A * | 7/1971 | Hall | | 315/108 |
| 4,918,975 A * | 4/1990 | Voss | | 73/40.7 |
| 5,193,380 A * | 3/1993 | Tallon | | 73/40.7 |
| 5,325,708 A * | 7/1994 | De Simon | | 73/40.7 |
| 5,561,240 A * | 10/1996 | Ochiai et al. | | 73/40.7 |
| 5,661,229 A * | 8/1997 | Bohm et al. | | 73/40.7 |
| 5,786,529 A * | 7/1998 | Voss et al. | | 73/40.7 |
| 6,014,892 A * | 1/2000 | Baret et al. | | 73/40.7 |

FOREIGN PATENT DOCUMENTS

| DE | 92 02 350 U1 | 4/1992 |
|---|---|---|
| DE | 43 26 267 A1 | 2/1995 |
| EP | 285 864 A1 | 10/1988 |

* cited by examiner

Primary Examiner—Daniel S. Larkin
(74) Attorney, Agent, or Firm—Bella Fishman

(57) ABSTRACT

Methods and apparatus are provided for leak detection by the accumulation method. The apparatus includes a sealable chamber (10) configured to receive a test piece (12) that, while in the chamber, contains a trace gas, a trace gas permeable member (30) in gas communication with the chamber, and a trace gas sensor (20) in gas communication with the permeable member and configured to sense the trace gas that passed from the chamber through the permeable member. The permeable member may be quartz. The trace gas sensor may include an ion pump.

18 Claims, 2 Drawing Sheets

METHODS AND APPARATUS FOR LEAK DETECTION BY THE ACCUMULATION METHOD

FIELD OF THE INVENTION

This invention relates to detection of leaks in sealed articles and, more particularly, to methods and apparatus for leak detection by the accumulation method.

BACKGROUND OF THE INVENTION

Helium mass spectrometer leak detection is a well-known leak detection technique. Helium is used as a tracer gas which passes through the smallest of leaks in a sealed test piece. After passing through a leak, a test sample containing helium is drawn into a leak detection instrument and is measured. An important component of the instrument is a mass spectrometer tube which detects and measures the helium. The input test sample is ionized and mass analyzed by the spectrometer tube in order to separate the helium component. In one approach, a test piece is pressurized with helium. A sniffer probe connected to the test port of the leak detector is moved around the exterior of the test piece. Helium passes through leaks in the test piece, is drawn into the probe and is measured by the leak detector. In another approach, the interior of the test piece is coupled to the test port of the leak detector and is evacuated. Helium is sprayed onto the exterior of the test piece, is drawn inside through a leak and is measured by the leak One of the difficulties associated with helium mass spectrometer leak detection is that the inlet of the mass spectrometer tube must be maintained at a relatively low pressure, typically $2 \times 10^{-4}$ Torr. In a so-called conventional leak detector, the test port, which is connected to the test piece or to the sniffer probe, must be maintained at relatively low pressure. Thus, the vacuum pumping cycle is relatively long. Furthermore, in the testing of leaky or large volume parts, it may be difficult or impossible to reach the required pressure level. If the required pressure level can be reached, the pumping cycle is lengthy.

Techniques have been proposed in the prior art to overcome this difficulty. A counterflow leak detector disclosed in U.S. Pat. No. 3,690,151, issued Sep. 12, 1972 to Briggs, utilizes a technique of reverse flow of helium through a diffusion pump to the mass spectrometer. The leak detector test port can be operated at the pressure of the diffusion pump foreline. A similar approach utilizes reverse flow of helium through a turbomolecular pump. A technique for gross leak detection is disclosed in U.S. Pat. No. 4,735,084 issued Apr. 5, 1988 to Fruzzetti. The tracer gas is passed in reverse direction through one or two stages of a mechanical vacuum pump. These techniques have permitted the test port pressure to be higher than for conventional leak detectors. Nonetheless, reaching the higher test port pressure can be difficult when testing large volumes, dirty parts or parts with large leaks.

In conventional helium leak detection, where a large leak is present in a hermetically sealed small part, the helium can be pumped away so fast during the rough pump cycle that no leak reading is possible and the leaking part is accepted. This problem has existed in the industry for a long time. The following methods have been utilized for some applications with limited results: (1) measure the difference in evacuation time between a leaky part and a non-leaky part, and (2) a volumetric expansion method. Neither technique provides sufficient resolution. U.S. Pat. No. 5,625,141, issued Apr. 29, 1997 to Mahoney et al., discloses a helium mass spectrometer leak detector combined with a volume expansion technique for gross leak detection.

European Patent Application No. 0 352 371 published Jan. 31, 1990 discloses a helium leak detector including an ion pump connected to a probe in the form of a silica glass capillary tube. The silica glass tube is heated to a temperature between 300° C. and 900° C. and thereby becomes permeable to helium. U.S. Pat. No. 5,325,708 issued Jul. 5, 1994 to De Simon discloses a helium detecting unit using a quartz capillary membrane, a filament for heating the membrane and an ion pump. U.S. Pat. No. 5,661,229 issued Aug. 26, 1997 to Bohm et al. discloses a leak detector with a polymer or heated quartz window for selectively passing helium to a gas-consuming vacuum gauge.

All of the prior art helium leak detectors have had one or more drawbacks, including limited pressure ranges, susceptibility to contaminants and/or high cost. Accordingly, there is a need for improved methods and apparatus for leak detection.

SUMMARY OF THE INVENTION

According to a first aspect of the invention, apparatus for leak detection is provided. The apparatus comprises a sealable chamber configured to receive a test piece that, while in the chamber, contains a trace gas, a trace gas permeable member mounted in gas communication with the chamber, and a trace gas sensor in gas communication with the permeable member and configured to sense the trace gas that passed from the chamber through the permeable member.

The permeable member may be permeable to helium, and the helium permeability of the permeable member may be controllable. In some embodiments, the permeable member comprises a quartz member. The apparatus may further comprise a heating element in thermal contact with the quartz member and a controller configured to control the heating element. The trace gas sensor may include an ion pump.

According to a second aspect of the invention, a method for leak detection is provided. The method comprises providing a sealable chamber, a trace gas permeable member in gas communication with the chamber, and a trace gas sensor in gas communication with the permeable member, placing in the chamber a test piece that, while in the chamber, contains a trace gas, passing the trace gas from the chamber through the permeable member, and sensing the trace gas with the trace gas sensor.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 1:
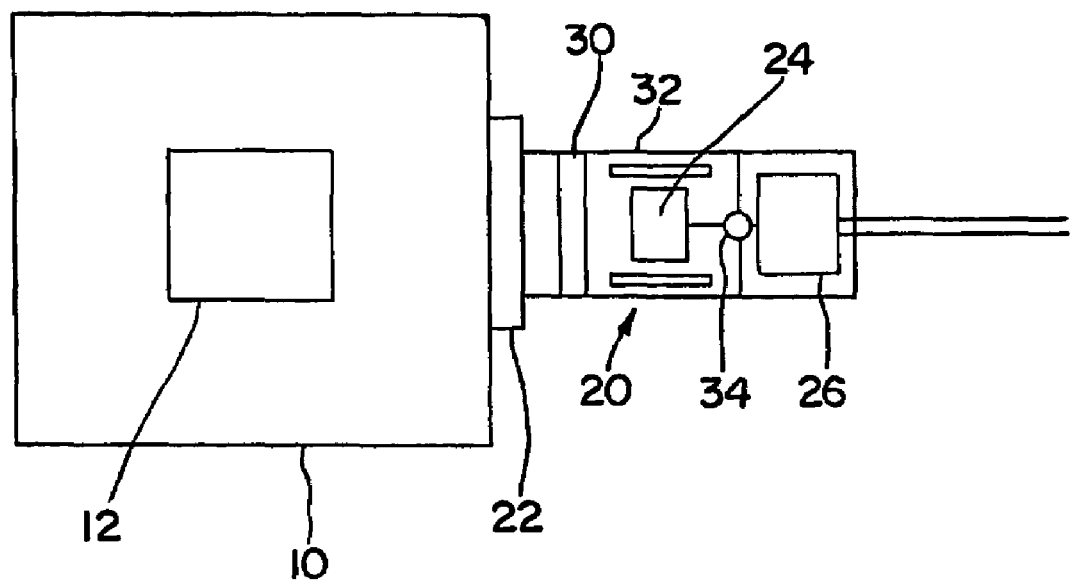
FIG. 1 is a schematic block diagram of leak detection apparatus in accordance with an embodiment of the invention.

A schematic block diagram of leak detection apparatus in accordance with an embodiment of the invention is shown in FIG. 1. A sealable chamber 10 holds a test piece 12. The internal volume of test piece 12 may be pressurized with a trace gas such as helium, may be exposed to a high helium concentration before being inserted into chamber 10 of the leak detection apparatus, or may be connected to a helium source while it is in chamber 10. In each case, the test piece 12, while in chamber 10, contains a trace gas such as helium.

A helium detector assembly 20 is connected via a vacuum flange 22 to chamber 10. Helium detector assembly 20 includes an ion pump 24, an ion pump controller 26 and a trace gas permeable member 30. Ion pump 24 and permeable member 30 are mounted in a sealed housing 32 with permeable member 30 interposed between chamber 10 and ion pump 24. Controller 26 is connected to ion pump 24 via a vacuum feedthrough 34. Controller 26 supplies power to ion pump 24 and senses ion pump current.

Ion pump 24 is typically energized by a high voltage, between 2,000 and 9,000 volts, supplied by controller 26. The ion pump current is proportional to the vacuum pressure inside the ion pump. Helium that permeates through permeable member 30 affects the vacuum pressure at a rate that is proportional to the leak rate. The ion pump current is therefore proportional to the leak rate.

Trace gas permeable member 30 is located between chamber 10 and ion pump 24. Permeable member 30 is a material that is permeable to the trace gas used in the leak detection apparatus, typically helium, under specified conditions. Permeable member 30 substantially passes, or permeates, the trace gas while substantially blocking other gases, liquids and particles. The permeable member 30 thus acts as a trace gas window in the sense of allowing the trace gas to pass while blocking other gases, liquids and particles. Permeable member 30 may have the shape of a disc, for example.

Figure 2:
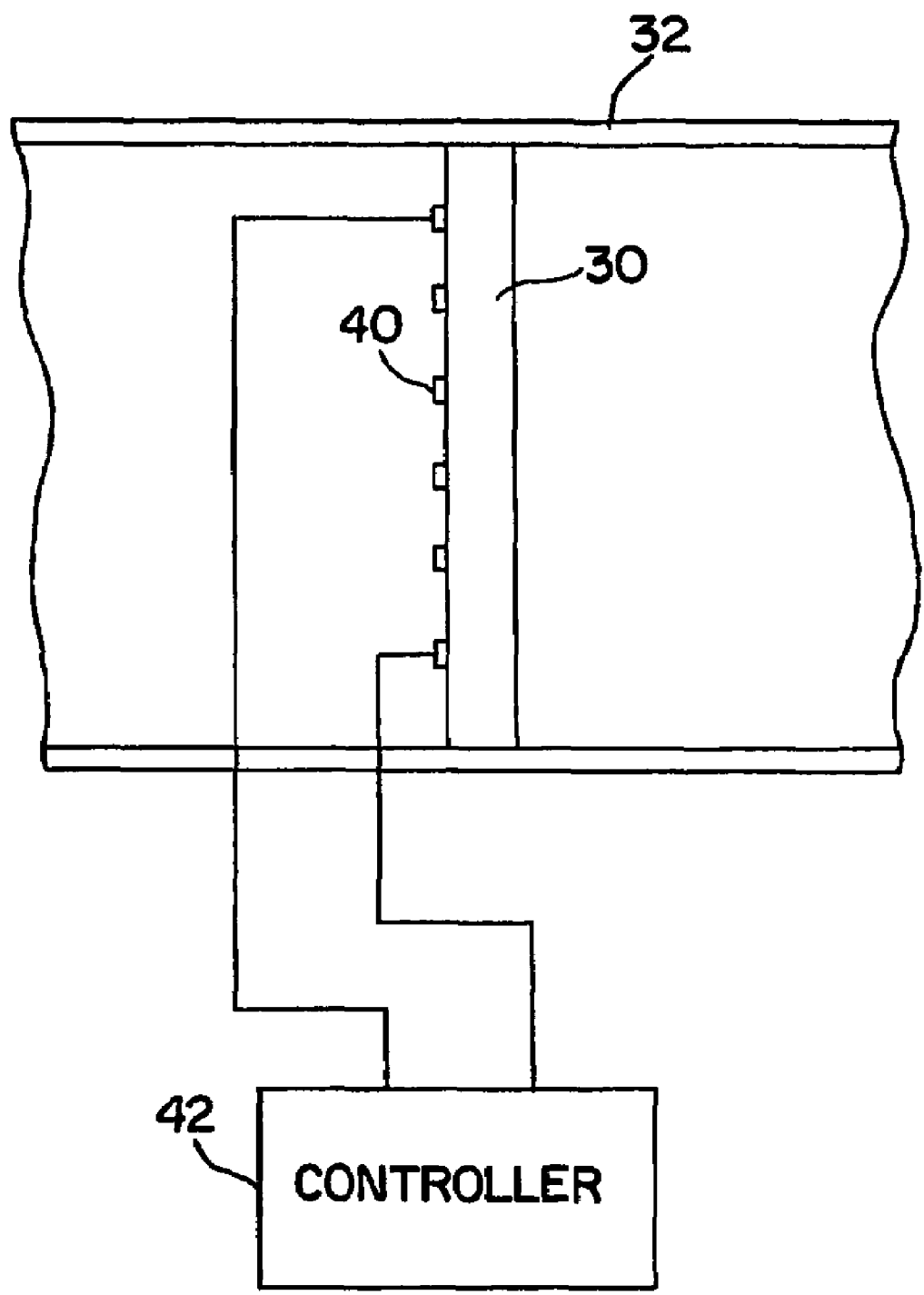
FIG. 2 is a simplified, partial cross-sectional diagram of the leak detection apparatus of FIG. 1, showing the permeable member.

Quartz, or silica glass, is an example of a material that is permeable to helium. In particular, the helium permeability of quartz varies with temperature. At elevated temperatures in the range of 300° C. to 900° C., quartz has a relatively high helium permeability. At room temperature, quartz has a relatively low helium permeability. As shown in FIG. 2, the leak detection apparatus may be provided with a heating element 40 in thermal contact with quartz permeable member 30. The heating element heats the quartz material to increase helium permeability while the quartz selectively blocks most other gases, water vapor and particles. The quartz has constant permeability for a given temperature. The temperature can be adjusted to control the permeability and therefore the sensitivity. Heating element 40 may be energized by a controller 42. By controlling the temperature of permeable member 30, a helium window is provided. At a relatively high temperature (e.g., 300° C. to 900° C.), helium permeability is high and the helium window is open. At a relatively low temperature (e.g., room temperature), helium permeability is low and the helium window is closed. Permeable member 30 may be heated by resistive heating, radiant heating, or any other suitable heating technique.

Permeable member 30 can be made of any suitable material that is permeable to the trace gas, typically helium, and may have any shape or dimension. Examples of suitable materials include quartz and permeable polymers such as tetrafluoroethylene, known under the trade name Teflon. The heating element is not required in the case of a permeable polymer. The permeable member can operate at vacuum, at atmospheric pressure or at a pressure slightly higher than atmospheric pressure. The permeable member can operate in an atmosphere that contains gases, particles and in wet environments.

In operation, test piece 12 is pressurized with helium or other trace gas and is placed in chamber 10. Chamber 10 is then sealed. The initial helium concentration in chamber 10 may correspond to the helium concentration in atmosphere (5 parts per million (ppm)) or may be lower than 5 ppm as a result of flushing chamber 10 with a gas such as nitrogen. Helium leaks from test piece 12 through any leaks that may be present. The helium concentration in chamber 10 is a function of the size of any leaks, the free volume of chamber 10 and the time that test piece 12 has been in chamber 10. Accordingly, the helium concentration is measured at one or more specified times after the time when the test piece 12 was sealed into chamber 10. Since the free volume and time are known, the leak rate can be determined. Chamber 10 and test piece 12 should not be deformable for proper operation of the accumulation method.

The helium in chamber 10 permeates through permeable member 30 to ion pump 24. Since the ion pump current is proportional to the pressure inside ion pump 24, the ion pump current is proportional to the leak rate from test piece 12.

Only helium passes through permeable member 30 and increases the pressure in ion pump 24. The increase in helium pressure produces an increase in ion pump current which is proportional to the increase in helium pressure and to the leak rate. The helium detector assembly 20 has essentially zero pumping speed in chamber 10, except for helium that passes through permeable member 30, and does not remove gas from chamber 10 as in the case of prior art devices. The helium detector 20 detects the helium leak but does not pump the helium away, so leaks are detected more accurately, more reliably and with more sensitivity than prior art methods.

Having thus described various illustrative non-limiting embodiments, and aspects thereof, modifications and alterations will be apparent to those who have skill in the art. Such modifications and alterations are intended to be included in this disclosure, which is for the purpose of illustration and explanation, and not intended to define the limits of the invention. The scope of the invention should be determined from proper construction of the appended claims and equivalents thereof.

What is claimed is:

1. Apparatus for leak detection, comprising:
   a sealable chamber configured to receive and enclose a test piece that, while in the chamber, contains a trace gas;
   a trace gas permeable member mounted in gas communication with the chamber; and
   a trace gas sensor comprising an ion pump in gas communication with the permeable member and configured to sense trace gas that passed from the chamber through the permeable member to the trace gas sensor, the sealable chamber being isolated, during leak detection by the ion pump, from gas communication with a vacuum pumping device other than the trace gas sensor and from any inlet to the sealable chamber.

2. Apparatus as defined in claim 1, wherein the permeable member comprises a quartz member.

3. Apparatus as defined in claim 1, wherein the penneable member comprises a quartz member, the apparatus further comprising a heating element in thermal contact with the quartz member and a heater controller configured to control the heating element.

4. Apparatus as defined in claim 1, wherein the permeable member comprises a polymer member.

5. Apparatus as defined in claim 1, wherein trace gas permeability of the permeable member is controllable.

6. Apparatus as defined in claim 1, wherein the permeable member is permeable to helium.

7. Apparatus as defined in claim 1, wherein the trace gas sensor includes means for sensing the trace gas at a specified time after the test piece containing the trace gas is placed in the chamber.

8. Apparatus as defined in claim 1, further comprising a housing enclosing the permeable member and the trace gas sensor and a vacuum flange for attaching the housing to the chamber.

9. A method for leak detection, comprising:
   providing a sealable chamber configured to receive and enclose a test piece, a trace gas permeable member in gas communication with the chamber and a trace gas sensor comprising an ion pump in gas communication with the permeable member, wherein the sealable chamber is isolated, during leak detection by the ion pump, from gas communication with a vacuum pumping device other than the trace gas sensor and from any inlet to the sealable chamber;
   placing in the chamber a test piece that, while in the chamber, contains a trace gas;
   passing the trace gas from the chamber through the permeable member to the trace gas sensor; and
   sensing the trace gas that passed through the permeable member with the trace gas sensor.

10. The method as defined in claim 9, wherein the permeable member comprises a quartz member.

11. The method as defined in claim 9, wherein the permeable member comprises a quartz member, the method further comprising heating the quartz member.

12. The method as defined in claim 9, wherein the permeable member comprises a polymer member.

13. The method as defined in claim 9, wherein the permeable member is penneable to helium.

14. The method as defined in claim 9, wherein passing the trace gas through the permeable member comprises controlling trace gas permeability of the permeable member.

15. The method as defined in claim 14, wherein controlling trace gas permeability of the permeable member comprises controlling sensitivity of leak detection.

16. The method as defined in claim 14, wherein controlling trace gas permeability of the permeable member comprises controlling temperature of the permeable member.

17. The method as defined in claim 9, wherein sensing the trace gas comprises sensing helium.

18. The method as defined in claim 9, wherein sensing the trace gas comprises sensing the trace gas at a specified time after the test piece containing the trace gas is placed in the chamber.

* * * * *